United States Patent [19]

Krueger et al.

[11] Patent Number: 4,796,378
[45] Date of Patent: Jan. 10, 1989

[54] SLIP-ON WEED GUARD FOR FISH HOOKS

[76] Inventors: Clyde A. Krueger, Box 107J, Lonsdale, Minn. 55046; Katharine C. Krueger, Box 107J R#1, Lonsdale, Minn. 55046; Herman A. Preus, 1101-14th Ave. S.E., Minneapolis, Minn. 55414

[21] Appl. No.: 571,134

[22] Filed: Jan. 16, 1984

Related U.S. Application Data

[63] Continuation-in-part of Ser. No. 555,437, Nov. 25, 1983, abandoned, which is a continuation of Ser. No. 340,007, Jan. 1, 1982, abandoned.

[51] Int. Cl.$^4$ .............................................. A01K 83/00
[52] U.S. Cl. ..................................... 43/43.2; 43/43.4; 43/42.4; 43/42.38
[58] Field of Search ................... 43/42.43, 42.42, 42.4, 43/42.1, 43.6, 43.2, 43.4, 42.25, 42.37, 42.38, 42.39

[56] References Cited

U.S. PATENT DOCUMENTS

| | | |
|---|---|---|
| 450,317 | 4/1891 | Munn ..................................... 43/42.43 |
| 539,149 | 5/1895 | Shattuck . |
| 755,677 | 3/1904 | Krus ..................................... 43/43.6 |
| 859,045 | 7/1907 | Burke ..................................... 43/43.4 |
| 2,185,507 | 1/1940 | Knapp . |
| 2,522,292 | 9/1950 | Modesto ............................... 43/43.4 |
| 2,576,795 | 11/1951 | Lane ................................. 43/42.42 X |
| 2,589,435 | 3/1952 | Roeben . |
| 2,615,277 | 10/1952 | Hayden . |
| 2,619,764 | 12/1952 | Mellin ................................. 43/42.52 |
| 2,623,321 | 12/1952 | Braukus . |
| 2,696,693 | 12/1954 | Markquart ..................... 43/42.42 X |
| 2,785,498 | 3/1957 | Youngquist et al. ................ 43/43.4 |
| 2,787,859 | 4/1957 | Bay ................................. 43/42.4 X |
| 2,932,114 | 4/1960 | Meucci ................................ 43/43.6 |
| 3,231,999 | 2/1966 | Gurka . |
| 3,274,726 | 9/1966 | Oney . |
| 3,562,948 | 2/1971 | Santo et al. . |
| 3,964,202 | 6/1976 | Ruppa . |

FOREIGN PATENT DOCUMENTS 1295573 12/1962 France ................ 43/42.43

Primary Examiner—Kurt Rowan
Attorney, Agent, or Firm—Jacobson and Johnson

[57] ABSTRACT

A molded plastic weed guard having a split, homogeneous, resilient, tubular body member for receiving and grasping the shank of a fishhook and one or more resilient arms radiating therefrom in covering alignment with the hook barbs.

4 Claims, 3 Drawing Sheets

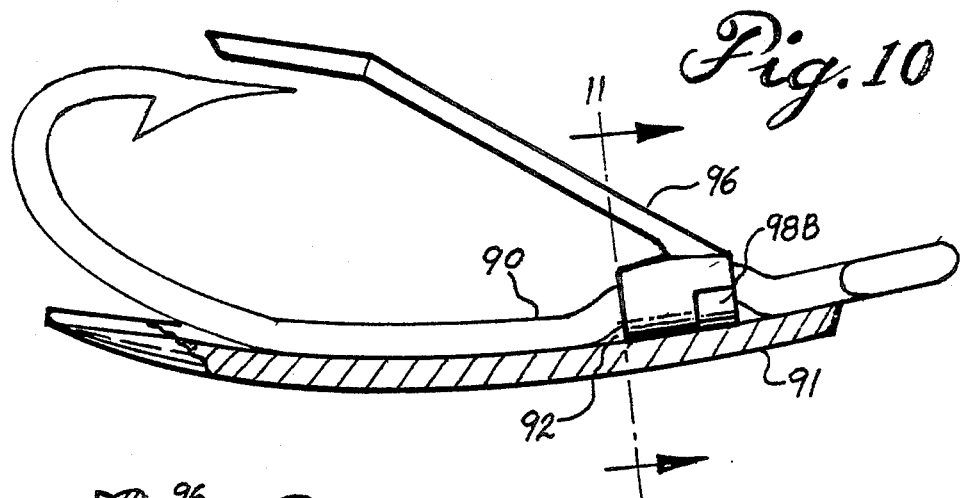
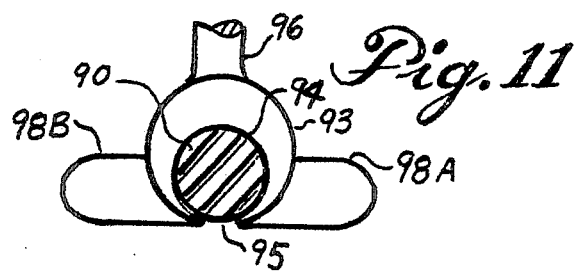
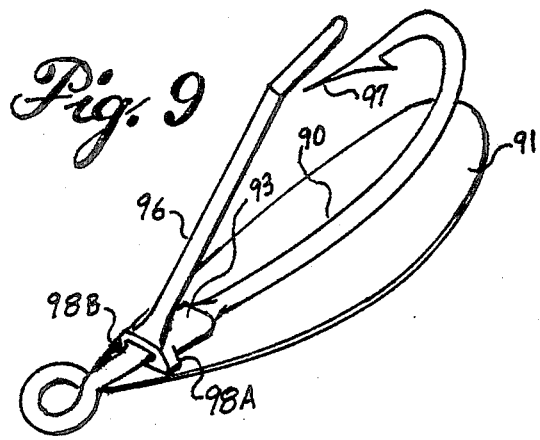
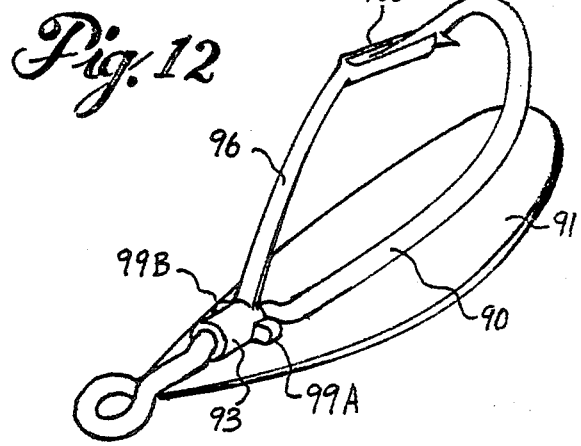
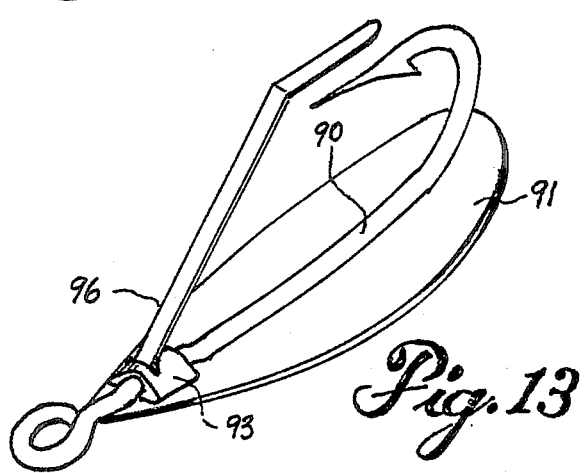

SLIP-ON WEED GUARD FOR FISH HOOKS

RELATED INVENTION

This is a continuation-in-part of U.S. application Ser. No. 555,437, filed Nov. 25, 1983, now abandoned, which is a continuation of U.S. application Ser. No. 340,007 filed Jan. 1, 1982, now abandoned.

FIELD OF THE INVENTION

This invention relates to the field of equipment for use by fishermen, and particularly to means for preventing fouling of fishhooks by weeds.

BACKGROUND OF THE INVENTION

It is well known to fishermen that when lures are drawn through the water their hooks are frequently fouled by weeds. This is sometimes misinterpreted by the fisherman as signifying that a fish has taken the lure. Sometimes weed fouling is so serious as to part the line, with the loss of a lure and the need to replace it before the sport can be resumed. Even if the line is not parted, the lure must be brought to the surface and cleared before fishing can be resumed.

Efforts to alleviate this situation in the past have taken two principal approaches. The first is the design of lures which by their very construction are more or less immune to fouling by weeds; such lures are not appropriate to all fishing conditions. The second approach is the design of accessories to be used with conventional hooks to prevent them from being fouled by weeds.

Fishhooks are made in many sizes by many manufacturers, with single, double or triple points or barbs extending from a shank having a loop or eye for securement to a line or lure. Triple hooks are often loosely secured to the bodies of such lures as an artificial mouse. Single hooks are often used in lures known as jigs. While there is some standardization in the nominal sizes of hooks, much variation is found from manufacturer to manufacturer, and the geometry of commercially available hooks is not at all uniform.

SUMMARY OF THE INVENTION

The present invention comprises an accessory weed guard which is readily attachable to and removable from the shank of any conventional fishhook of appropriate size, without the use of any tool or instrument. It comprises a central tubular body having a longitudinal bore to receive the shank of a hook, integral with one or more resilient arms projecting therefrom to deflect weeds from the point or points of the hook. The body is longitudinally slit to enable the guard to be applied laterally to the shank of a hook without removing the hook from a lure or line and the material used for the guard is not only flexible but resilient as well so that it normally tries to retain the slot in the substantially closed condition. Appropriate means are provided to prevent rotation of the guard on the shank of the hook so that each arm remains generally aligned with the point it is to protect. This is accomplished not only by the holding force of the tubular body on the shank, but may also be, in the case of multiple hooks, by making the bore noncircular in cross section and for single hooks by providing an extension from the tubular body for engaging the eye of the hook or by modifying the end of the arm to releasably engage the point.

Various advantages and features of novelty which characterize the invention are pointed out with particularity in the claims annexed hereto and forming a part hereof. However, for a better understanding of the invention, its advantages, and objects attained by its use, reference should be had to the drawing which forms a further part hereof, and to the accompanying descriptive matter, in which there are illustrated and described certain preferred embodiments of the invention.

BRIEF DESCRIPTION OF THE DRAWING

In the drawing, in which like reference numerals indicate corresponding parts throughout the several views.

FIG. 9 is an embodiment of the invention used with a fishhook longitudinally attached to a lure;

FIG. 10 is a somewhat enlarged partially sectioned side elevational view of FIG. 12;

FIG. 11 is a view taken along viewing line 11—11 of FIG. 10;

FIG. 12 is a modified version of the embodiment illustrated in FIG. 9;

FIG. 13 is another modified version of the embodiment of FIG. 9; and

FIG. 14 is a sectioned view of FIG. 13.

DESCRIPTION OF THE PREFERRED EMBODIMENTS

Figure 1:
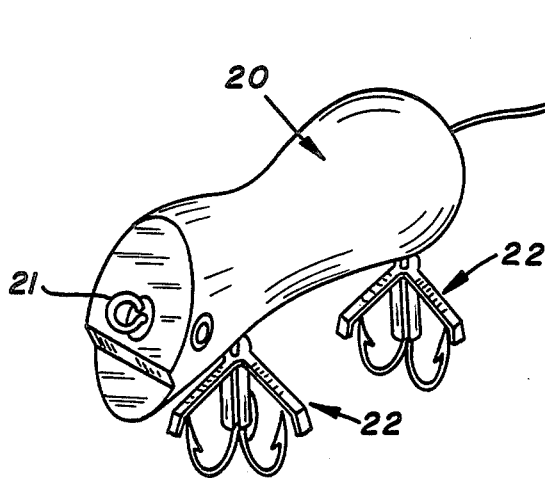
FIG. 1 is a perspective view of a lure having multiple hooks guarded according to the invention.
Figure 2:
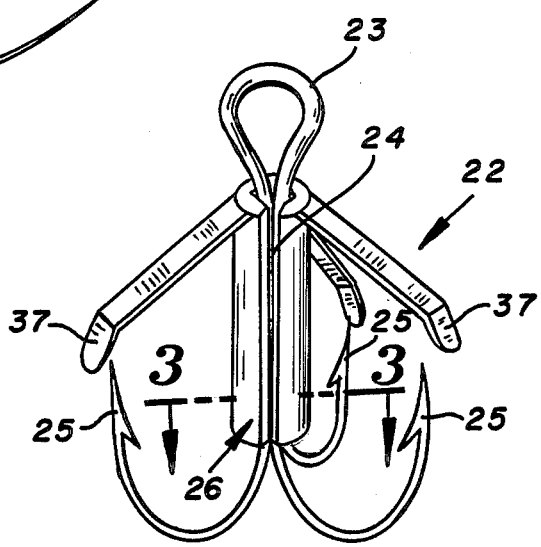
FIG. 2 is a perspective view of a guarded triple hook.
Figure 3:
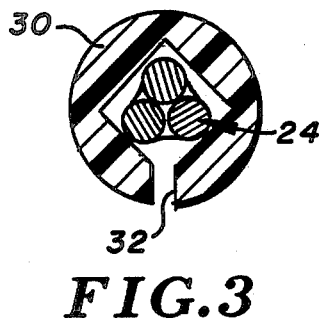
FIG. 3 is a fragmentary view in section along the line 3—3 of FIG. 2.

In FIG. 1 an artificial mouse lure 20 is shown to have an eye 21 for attachment to a fishing line and a pair of loosely attached triple hooks 22 guarded against fouling by weeds FIG. 2 shows that each hook 22 includes an eye 23 at one end of a triple shank 24 and three points or barbs 25 extending from the other end of the shank, which is accordingly noncircular in transverse section, as suggested in FIG. 3. The points 25 are nominally spaced at equal angles about the axis of the hook. Shank 24 is received in a guard 26 of material which is not only flexible but resilient as well.

Figure 4:
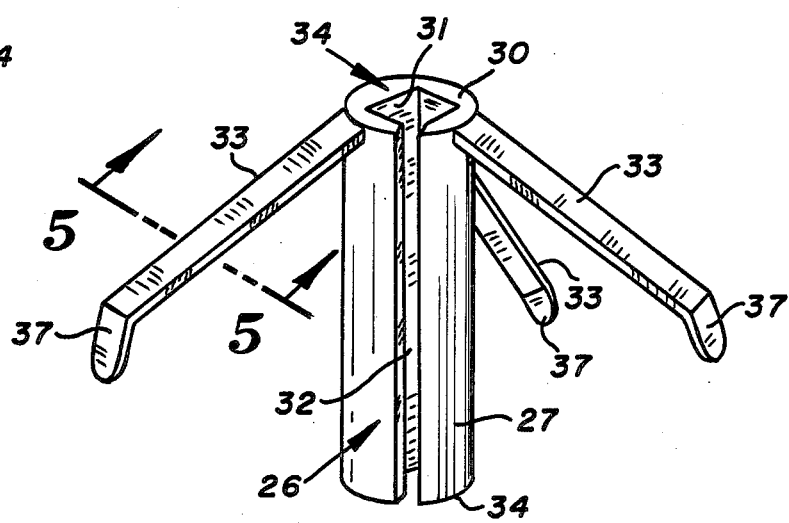
FIG. 4 is a perspective view of a weed guard according to the invention for use with triple hooks to a larger scale.

As shown in FIG. 4, guard 26 comprises a tubular homogeneous body 27 comprising a wall 30 surrounding a central bore 31 of noncircular cross section to prevent rotation of the guard on the shank of the hook. Wall 30 has a longitudinal slit 32 in communication with the bore 31 and the resilience of the material is such to normally try to maintain slit 32 closed although by pressing the shank of a hook laterally into slit 32 the latter can be forced open sufficiently for the shank to be received in bore 31.

A plurality of resilient arms 33, equal in number to the number of points 25, are integral with body 27 at one end 34, in this case the end closest to the eye of the hook, and extend laterally therefrom in directions having components toward the other end of body 27. Arms 33 are equally spaced angularly about the axis of the tube 26 and extend out therefrom over the points 25 of an appropriately sized hook, as is clearly shown in FIG. 2, to deflect weeds from the points of the hook.

Figure 5:
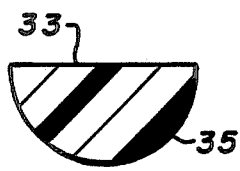
FIGS. 5 and 6 are fragmentary sectional views generally along the line 5—5 of FIG. 4 showing modifications of the structure.
Figure 6:
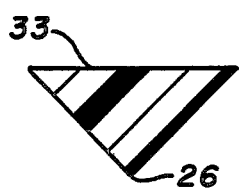

Arms 33 are sufficiently rigid to resist deformation by normal contact with weeds as the hook moves through them but are also sufficiently resilient to be bent toward body 27 away from the point 25 under the applied force of a striking fish. To ensure that the arms do not engage the points directly and so fail to bend, the inner surfaces of the arms may be given a curved configuration 35, as in FIG. 5, or an apexed configuration 36, as in FIG. 6. Under some circumstances it is desirable that the ends 37 of arms 33 be bent slightly toward the points of the hook as shown in the drawing. The nature of the material is such that these ends may easily be snipped off if the user does not want them.

Heretofore it has been the custom to form the bore of a weed guard to an average cylindrical size which will in some fashion accept the shanks of hooks by various manufacturers, some being quite loose in the bore while others scarcely permit the shank to be inserted. A feature of the present invention is the construction of body 27 in such length as to comport with the lengths of the straight shanks of hooks by all makers in a predetermined range of sizes and also of such diameter as to enable the provision of various central bores 31 to comport with the cross sectional configurations of the various particular hook structures in said range as supplied by various manufacturers, which has not previously been commercially feasible. The guards may then be packaged for delivery with indication of exactly what hooks their bores are designed for to accomplish semi-mass production of guards individually configured to fit specific hook structures.

Figure 7:
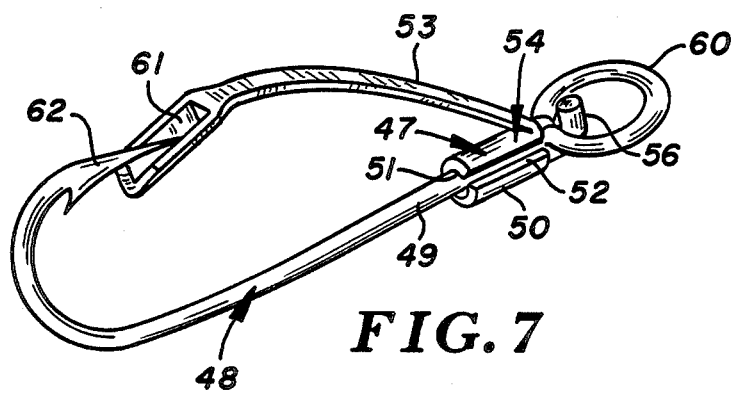
FIG. 7 is a perspective view of a single hook guarded according to the invention.

A second embodiment of the guard for use with a single hook 48 is shown in FIG. 7 to comprise a body 47 including a wall 50 surrounding a central bore 51 which may, if desired, be of circular cross section. Wall 50 has a longitudinal slit 52 and the resilience of the material of the guard is such that it normally tries to maintain slit 52 closed, although by pressing the shank of a single hook against the slit laterally, the slit can be forced apart sufficiently for the shank 49 of the hook to be received in bore 51.

An arm 53 is integral with body 47 at one end 54 and extends outwardly and laterally therefrom past the other end of the body in a curve which terminates at point 62 of a hook 48 of selected size. In addition to the grasping action of body 47 on the hook shank 49, a finger 56 extends from end 54 and is positioned and configured to enter the eye 60 of hook 48 when arm 53 is aligned with point 55 to help keep this alignment. Arm 53 may also be provided with a point-receiving groove 61 pressed outwardly by the resilience of the arm. Either finger 56 or groove 61 may be used alone to help prevent guard rotation about shank 49. The curvature of arm 53 is sufficient to deflect weeds from engaging point 62. On the other hand, the resilience of arm 53 is such as to allow it to yield when a fish strikes so that the mouth of the fish will take the barb 62.

The particular advantage of guards according to the invention is that they may be molded integrally from a single material such as Nylon or Delrin without the need for any reinforcements or inserts. They may be carried loose in a tackle box, are easily attached or removed, are self-locating and may be modified or bent slightly at the time of installation to give a very precise fit with the hook to be used as the geometry of a particular hook departs from the nominal.

Figure 8:
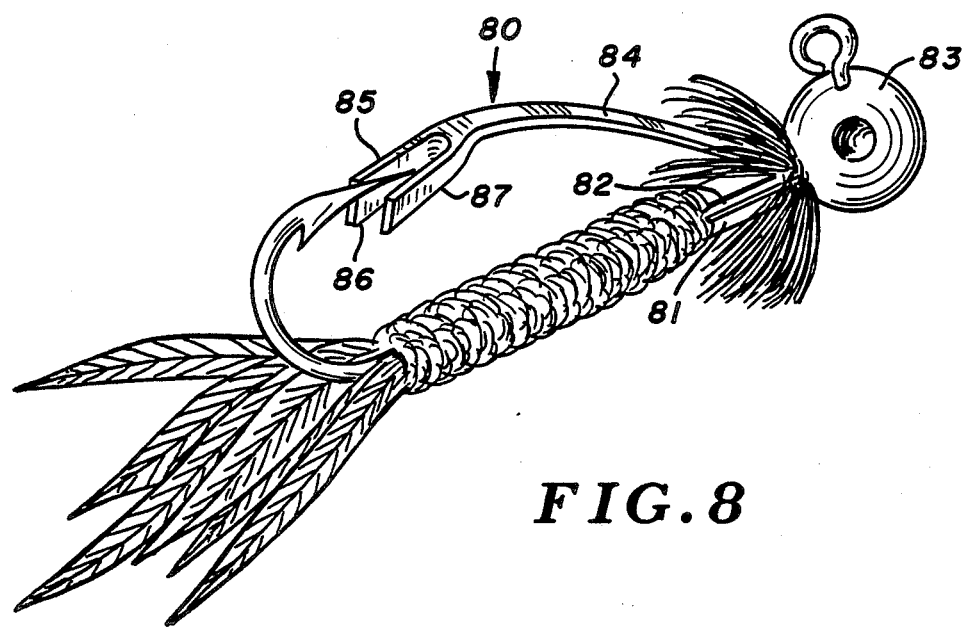
FIG. 8 is a perspective view of a weed guard according to the invention used with a jig.

FIG. 8 shows the invention applied to a single hook in a jig. Guard 80 includes a body 81 with a central bore (not seen) and a longitudinal slot 82 which may be opened to allow body 81 to grip the serving of the jig under the maribou or other material near the head 83 of the jig. An arm 84 extends from body 81, arching outwardly to an end portion 85 having bifurcations 86 and 87 between which the point 90 of the jig is normally positioned by the resilience of arm 84. The force of a striking fish is sufficient to move arm 84 inward so that the point 90 will be engaged by the mouth of the fish.

Referring to FIG. 9 the shank 90 of a single pointed or barbed fishhook may be attached lengthwise to the body of a fishing lure such as a spoon 91. The attachment can be made in any convenient fashion such as spot welding or the like. To accommodate a slip-on weed guard of the nature described herein, there is provided a short gap 92 between the fishhook shank 90 and the spoon 91. The gap may be formed by making the shank slightly thinner or by bending the shank so it is separated from the spoon or in any other fashion. The tubular homogeneous body 93 having a longitudinal bore 94 and a longitudinal slot 95 through the wall of the tube in communication with bore 94 is slipped onto the shank 90 in the gap area 92 by laterally inserted the shank through slit 95. As described earlier, the tubular body 93 has some degree of resiliency, being made of a plastic having a memory characteristic, so that when slit 95 is spread apart and the shank inserted the tube body tends to try to close the slit 95 and in doing so tenaciously and firmly grasps onto shank 94. This keeps the tube in place on the shank. Extending out from the tubular body 93 is a somewhat flexible arm 96 which extends out over the point or barb 97 of the fishhook to guard against weeds yet yields to a biting fish in the same fashion as described hereinabove. As an added feature to provide a safety precaution to insure that tubular section 93 does not slip or rotate on shank 90, tubular section 93 has integrally formed stubs 98A and 98B extending outward therefrom resting against the surface of the spoon 91. As illustrated in FIG. 9 the stubs may take the form and shape of 98A and 98B and be located near the top edge of the tubular member, i.e., nearest the eye of the fishhook, or may be in the form and shape of stubs 99A and 99B and located near the lower edge of the tubular member 93. Also, FIG. 12 illustrates arm 96 having a bifurcated end at 100 which may provide additional protection against weeds. Still another form that the holding stubs can take is illustrated in FIGS. 13 and 14 where the body of the tubular member 93 is triangular in cross section and the bottom surface rests against the surface of spoon 91.

From the above it will be evident that the invention comprises a weed guard integrally formed from flexible yet resilient material, for ready application to or removal from the shank of a hook of suitable size and of any manufacture, the resilience of the material being such as to retain the guard on the hook without additional adhesive or mechanical connection means, although the material is susceptible of additional securement by adhesive means or by heat-fusion if desired. Material of any color may be used as desired.

Numerous characteristics and advantages of the invention have been set forth in the foregoing description, together with details of the structure and function of the invention and the novel features thereof are pointed out in the appended claims. The disclosure, however, is illustrative only and changes may be made in detail, especially in matters of shape, size and arrangement of parts, within the principle of the invention, to the full extent indicated by the broad general meaning of the terms in which the appended claims are expressed.

As an additional feature, since the tubular body is homogeneously plastic it can be easily snipped or clipped to a desired length. This is not the case with weed guards which have a metal insert or spring for holding it in place.

We claim:

1. A weed guard for fishhook comprising
    a homogeneous tube of molded, resilient, plastic material having a lengthwise bore and a lengthwise slit through the tube wall in communication with said bore, said tube characterized in that when the shank of a fishhook is inserted into the bore the side wall is self-biased to close the slit so that the tube tenaciously grasps the fishhook shank to prevent it from slipping on the shank;
    integrally formed arm means extending outward from said tube at one end aligned to at least in part yieldably cover the point of a fishhook at the distal end; and
    a member projecting from said tube for entering the eye of a fishhook when said arm means is aligned with the fishhook point.

2. For a fishhook which is immovably attached at least in part along its shank to the surface of a fishing lure a weed guard comprising:
    a homogeneous tube of molded, resilient, plastic material having a lengthwise bore; a lengthwise slit through the tube side wall in communication with said bore for inserting the shank of the fishhook into the bore, said tube characterized by tenaciously grasping an inserted shank; arm means attached at one end to said tube and extending outward to yieldably cover a point on the fishhook at its distal end; and stub means integrally formed with and extending out laterally from said tube for resting against the surface of said lure for preventing said tube from rotating about the shank.

3. A weed guard molded from a resilient material for removable attachment to the shank of a fishhook comprising:
    a tubular body member having a longitudinal bore and a longitudinal slit formed through the tube wall for releasably tenaciously grasping the shank of a fishhook located within said bore;
    at least one resilient arm extending from said body member toward a point of said hook, said arm including means at the end thereof adjacent to the point of said hook for protecting said point so as to deflect weeds therefrom while yielding to the presence of a biting fish; and
    a member projecting from said tubular body member into the eye of said fishhook when said arm is aligned with a point of the hook.

4. In combination:
    a fishing lure having an elongated surface area;
    a fishhook immovably attached at least in part along its shank to said surface area; and a weed guard comprising a homogeneous tube of molded, resilient plastic material having a lengthwise bore with a lengthwise slit through the tube side wall in communication with said bore for inserting the shank of the fishhook into one bore, said tube tenaciously grasping said inserted shank to prevent the tube from slipping on the shank, arm means attached at one end to said tube and extending outward to yieldably cover a point on the fishhook at its distal end, and stub means integrally formed with and extending laterally out from said tube resting against the surface of said lure for preventing said tube from rotating about the shank.

* * * * *